Figure 1:
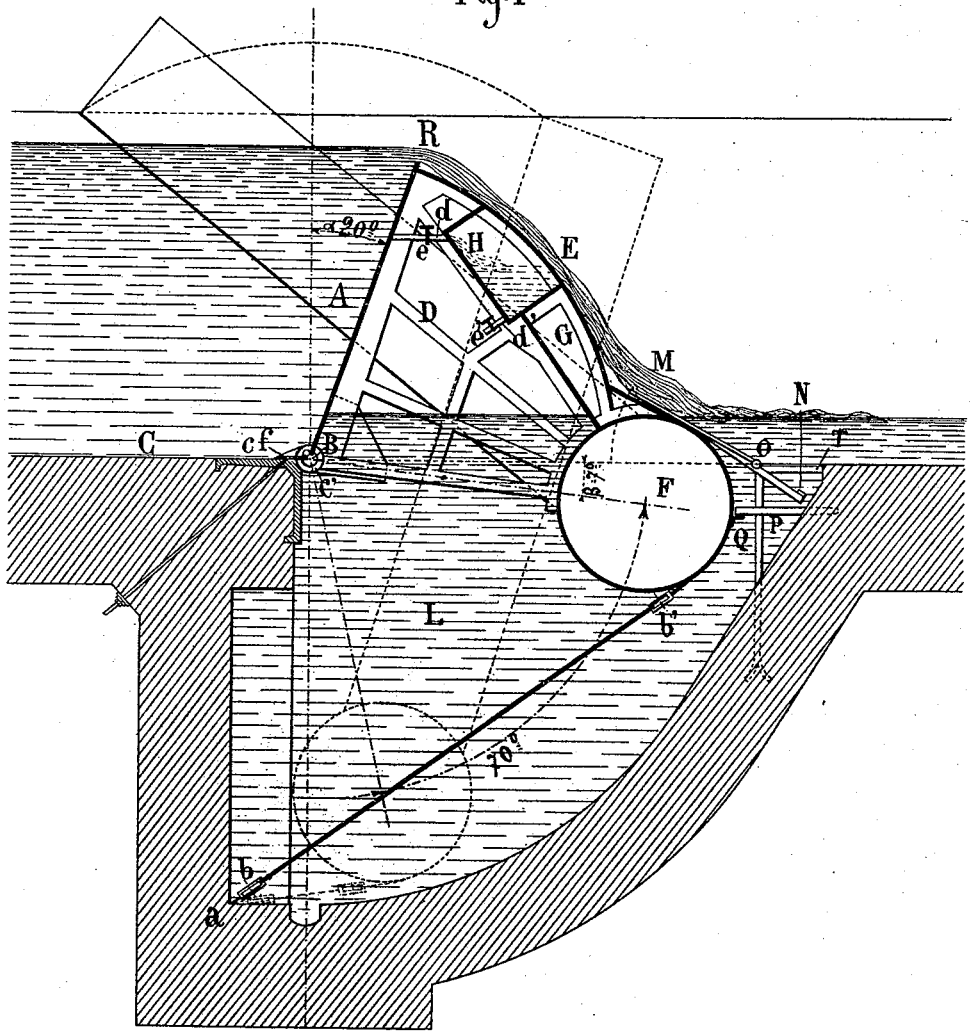

(No Model.) 2 Sheets—Sheet 1.

L. DEBARLE.
FLOATING DAM.

No. 464,350. Patented Dec. 1, 1891.

Witnesses:
Jonathan Cilley
G. M. Capenhaver

Inventor
Louis Debarle
By Pollok & Mauro
his attorneys.

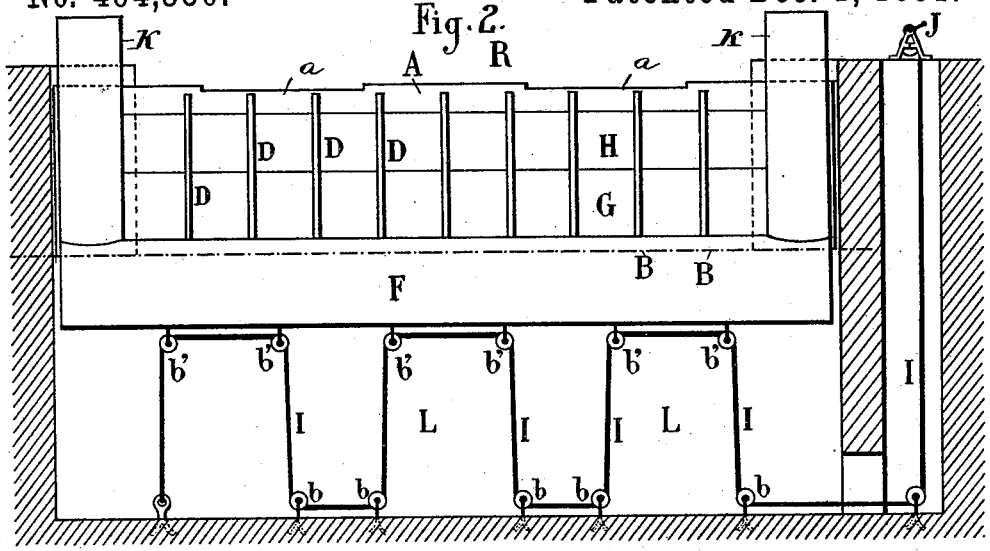
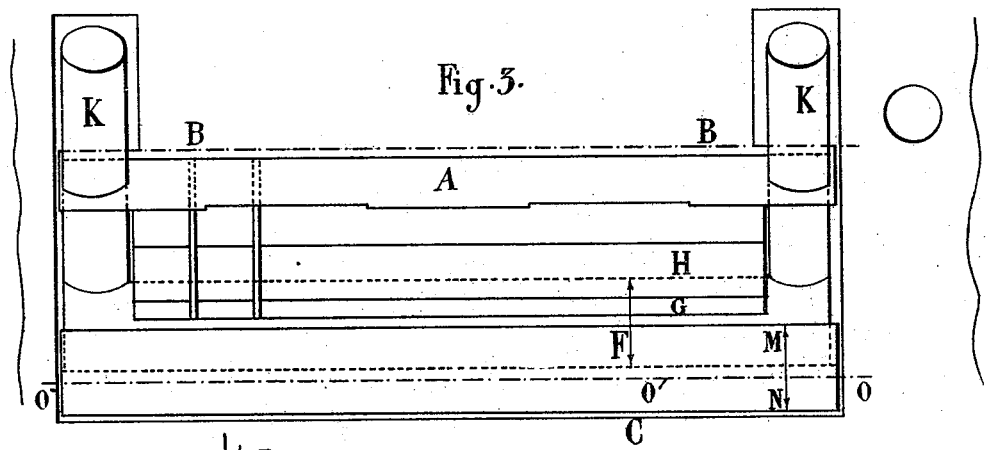
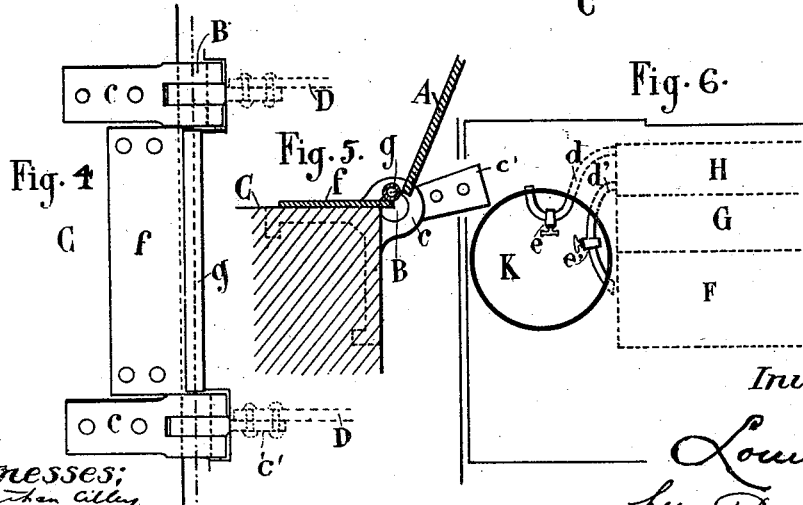

UNITED STATES PATENT OFFICE.

LOUIS DEBARLE, OF PARIS, FRANCE.

FLOATING DAM.

SPECIFICATION forming part of Letters Patent No. 464,350, dated December 1, 1891.

Application filed August 12, 1891. Serial No. 402,442. (No model.) Patented in France December 30, 1890, No. 210,502.

*To all whom it may concern:*

Be it known that I, LOUIS DEBARLE, of Paris, in the Republic of France, have invented new and useful Improvements in Floating Dams, (for which I have obtained a patent in France, No. 210,502, dated December 30, 1890,) which is fully set forth in the following specification.

This invention relates to dams whose object is to regulate the water in a stream by being raised or lowered as occasion may require. In accordance therewith a dam is constructed which is adapted with facility to be raised to present its entirety to the stream or to be lowered so as to be effaced completely. Said dam is balanced, and it comprises a gate and a float connected together and mounted to turn about a horizontal axis.

In the accompanying drawings, which form part of this specification, Figure 1 is a cross-section of the dam in position in a stream. Fig. 2 is an elevation, partly in section, in a plane at right angles to that of Fig. 1. Fig. 3 is a plan showing the arrangement of chimneys situated at certain portions of the gate. Figs. 4 and 5 are details showing the manner in which the gate is hinged, and Fig. 6 shows the arrangement of cocks to facilitate the balancing of the gate.

The gate A, arranged between piers or abutments and adapted to turn on journals B at the level of the bed C of the stream, is connected by arms D in the form of sectors with the cylindrical or prismatic float F, which may serve as a tunnel or passage from one bank to the other. When the water is sufficiently deep to render it desirable, the float F is provided with the supplementary reservoirs G H, which assist in the maneuvering and in establishing the conditions of equilibrium of the dam.

The float F is held by a reeved cable I, connected with a windlass J. It is provided at each end with a chimney or vent K, in which are a ladder and staircase adapted to permit the entry and exit from the interior of the float in order to pass from one bank to the other.

Below the bed of the stream a chamber L (whose bottom is curved, as shown) is formed the full length of the gate or of each of the gates, in which chamber the float is placed and wherein it is movable. In the angle $a$ of this chamber are secured two pulleys $b$, over which and over the pulleys $b'$ on the float F the cable I is reeved. The end of this cable passes out through a side chamber to the windlass J. (See Fig. 2.) A diver may descend by steps in this side chamber into the chamber L and ascertain that everything is in place. Strong ear-plates $c$ are anchored on the bottom C at the angle between said bottom and the wall of chamber L, opposite each of the sector-arms D. They are fitted to ear-plates $c'$ on the corresponding sector-arms D. They serve as hinges or sockets for the journals B, which do not extend beyond the faces of the ear-plates. Between the various journals B, Fig. 4, metallic plates $f$ are fixed on the stream-bed, so that their outer edges come very near the lower edge of the door in line with the theoretic axis of the journals B. There consequently exists longitudinally of this axis, between the journals only, a very narrow passage on which may be applied a small metallic tube or other packing, such as $g$, Fig. 5, for the purpose of preventing any escape of water between the edge of floor C and bottom of gate A.

The dam thus constituted by a gate and a float connected with each other and adapted to turn about the same journals has the characteristic property that if the angle between the gate A and a vertical plane be the same as the angle between a plane through the axis of the journals and the center of pressure of float F and a horizontal plane, the dam will (if the depth of the stream flowing over the dam and the weight of the pieces be neglected) be in equilibrium in all positions. From this property it results that even with strong falls equilibrium can nearly be secured, even without forming a right angle between the two planes considered, and that the dam can easily be kept up by a relatively feeble preponderance of force from below upward and can be controlled by means such as a drawing-windlass or a windlass and reservoirs G H, whose operation is explained below.

The auxiliary reservoir G, which is closed tightly and is distinct from the float F, has for its object in the case of strong heads of water to augment the preponderating reaction from below upward, in proportion to the yielding of the gate A under the action of a rise in the stream, which increases the pressure and the thickness of the overflow. Its action eventually permits a corresponding diminution in the initial reaction of the float, and consequently diminishes the tension of the cable I. It permits, also, the relief of the action of the windlass in this sense, that in effacing the dam, in consequence of heavy rises or the breaking up of ice, water may be introduced into the reservoir G, this water being sucked in by the aid of any suitable apparatus or being forced out by means of condensed air obtained by utilizing the fall itself of the dam.

The upper reservoir H is equally distinct from the float F and the reservoir G. It can receive a certain amount of water through the pipe $d$ and cock $e$ from a point upstream, which water may be discharged in whole or in part down the stream through the pipe $d'$ and cock $e'$. By the simple manipulation of these cocks, which can be effected from either one of the chimneys K, as shown in Fig. 6, the preponderance of the reaction of the float F or of float F and reservoir G can be diminished or increased.

A floor M M, movable about an axis $o$, bears on the float F, which is elevated a little above the bed of the stream, by reason of the existence of a certain elevation of the waters at the bottom of the fall, which elevation it is useful to utilize in order to lessen by so much the foundation of the chamber L. The cross-pieces N, by coming in contact with the under side of the stationary floor T, assures the horizontality of the floor M. This floor effects, with the face E, a certain separation between the overflowing waters and those of the chamber L. The rise of the float F is limited by the projection Q, making contact with the stops P.

Each of the chimneys K is lodged and movable about the axis of the journals B, within a recess formed in the face of the pier or abutment, so that its outer face is flush with that of said pier or abutment.

To avoid the effects of torsion on the length of the gate the crest R of the overflow is cut away for a certain distance on each side of and for an equal distance in the middle of the gate, as at $a\ a$, Fig. 2, so that the sheet of water overflowing begins always in these cut-away places and is there maintained with greater intensity than elsewhere.

In Fig. 1 the dam is represented in the raised position corresponding to the smallest flow of the stream and with a certain preponderance of the reaction due to the float F over the action resulting from the weight of the pieces and the presence of the water above the dam. In this position the dam can be lowered or put out of action by the pull of the windlass J. This pull can be aided or its intensity diminished by causing water to enter the reservoir H or the reservoir G, or both reservoirs, and this assistance is particularly useful in effacing the dam completely when menaced by a freshet or the breaking up of ice. The preponderance of the float should not, however, be completely overcome; but the cable should always be called upon to exert more or less pull. The dam being in the position of Fig. 1, with a certain preponderance of the reaction from below upward, and the gate making with the vertical an angle of about twenty degrees, (20°,) if a rise in the stream takes place, or if ice accumulates momentarily at the crest of the gate, in that case the pressure overcomes the sustaining reaction and the float yields; but the equilibrium is re-established by the immersion of a part of the auxiliary air-reservoir G. When the stream diminishes, the ice is displaced (leaving the overflow free.) Then the reaction again becomes preponderant and raises the dam to bring it automatically to a new position of equilibrium.

By the dispositions described and illustrated it is seen that the apparatus is such and is so established that it is easy without exaggerated effort to regulate its position by means of the windlass J, according as this pulls in or lets out the cable I. It is also seen that, particularly in the case of strong heads or pressures of waters, the reservoirs G H can effectually aid the manipulation by increasing or diminishing the preponderating reaction from below upward, and that for limited surface actions the gate may operate automatically.

I claim as my invention or discovery—

1. The combination of the gate hinged at its bottom to the bed of the stream and adapted to turn on its hinge and to occupy a chamber beneath the bed of the stream when not in use, and a float rigidly connected with said gate and placed in said chamber, substantially as described.

2. A dam comprising a gate adapted to turn on journals about a horizontal axis and connected by sector-arms with a float immersed in water below the dam, whose preponderating reaction from below upward places the whole system in a state of stable equilibrium, substantially as described.

3. The combination of the gate hinged to the bed of the stream, a chamber beneath the bed to receive the gate when lowered, a float rigidly connected to the gate on the downstream side, and means, such as a chain and windlass, for controlling the position of the float and gate, substantially as described.

4. A dam having a balancing float which is hollow and is adapted to serve as a passage-way across the stream, substantially as described.

5. In a movable dam, the combination of the gate and the float pivoted to turn upon a common axis and the auxiliary reservoirs, substantially as described.

6. The combination of the gate, its balancing float, said gate and float being pivoted to turn on a common axis, auxiliary reservoirs, and means, such as a windlass and chain, for maneuvering the gate and float, substantially as described.

7. The combination of the gate hinged at the bed of the stream, the hollow float rigidly connected with said gate and extending the full length thereof, and chimneys or passages communicating with the ends of the float, substantially as described.

In testimony whereof I have signed this specification in the presence of two subscribing witnesses.

LOUIS DEBARLE.

Witnesses:
ROBT. M. HOOPER,
CH. CASALONGA.